UNITED STATES PATENT OFFICE.

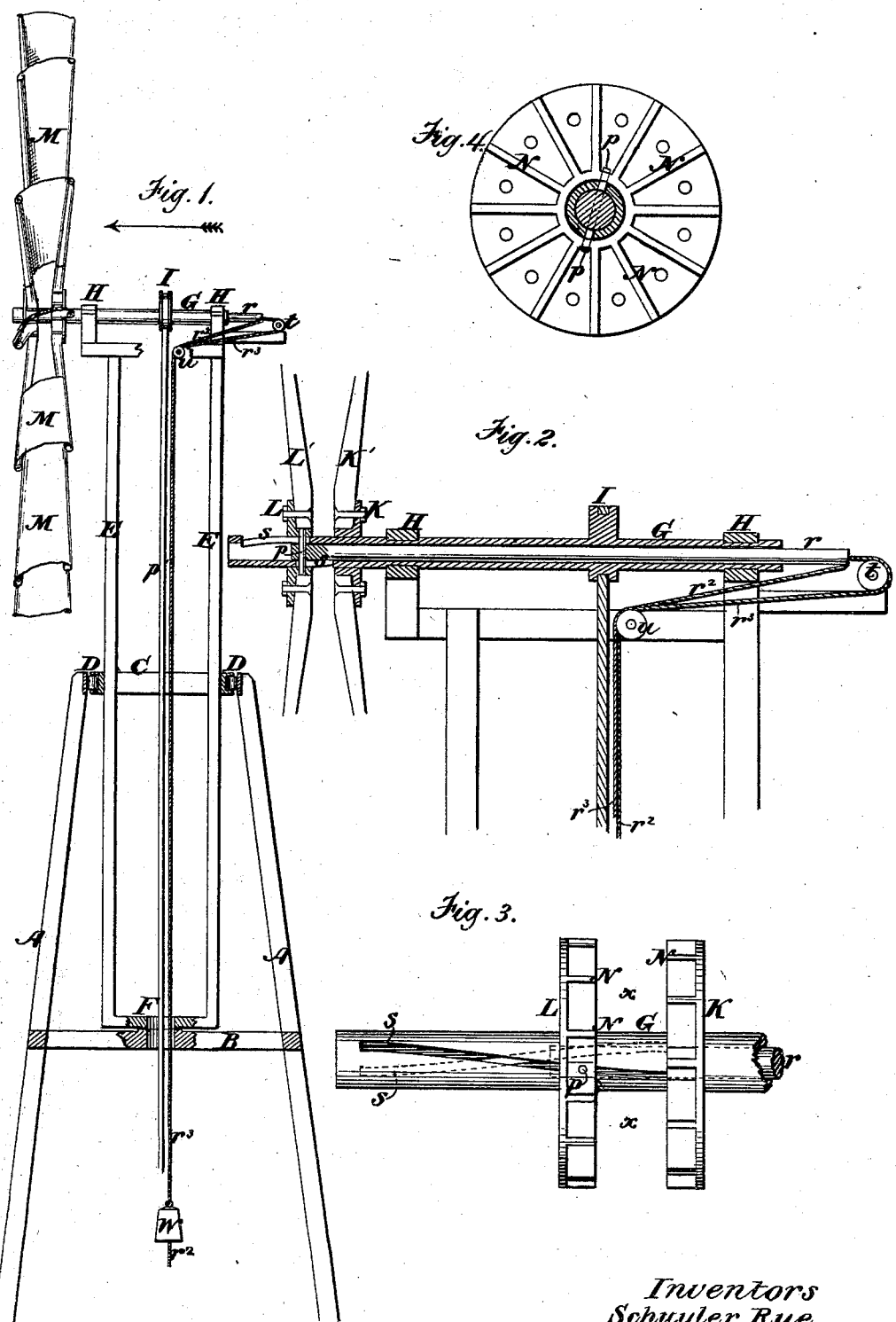

SCHUYLER RUE, JR., OF ELGIN, AND WILLIAM R. MANN, OF EARLVILLE, ILL.

IMPROVEMENT IN WINDMILLS.

Specification forming part of Letters Patent No. 149,793, dated April 14, 1874; application filed February 28, 1874.

*To all whom it may concern:*

Be it known that we, SCHUYLER RUE, Jr., of Elgin, in the county of Kane and State of Illinois, and WILLIAM R. MANN, of Earlville, in the county of La Salle, same State, have invented certain new and useful Improvements in Windmills; and we do hereby declare the following to be a full, clear, and exact description of the same, reference being had to the accompanying drawings forming part of this specification, in which—

Figure 1 is a side elevation of our improved windmill, partially in section. Fig. 2 is a longitudinal section of the same. Fig. 3 is an elevation, showing the spiral slot in the shaft and the hubs with the arms removed; and Fig. 4 is a section through line $x\ x$, Fig. 3, looking toward the movable hub.

Similar letters of reference in the accompanying drawings denote the same parts.

Our invention relates to that class of windmills in which the pressure of the wind on the sails is automatically regulated; and to this end it consists in the employment of certain devices for that purpose, as hereinafter more fully set forth.

In the accompanying drawings, A A are the inclined supports for the windmill, provided with a cross-piece, B, which supports the frame E E, in the upper end of which is journaled, at H H, the horizontal hollow shaft G, to which is attached the fixed hub K. L is a movable hub fitting loosely over the outer end of the hollow shaft G, and capable of sliding thereon, as hereinafter more fully set forth. L′ K′ are arms, to which the flexible sails M M, made of cloth or other similar flexible material, are attached, the lower ends of said arms being enlarged and made wedge-shaped to fit into the correspondingly - formed wedge - shaped spaces on the faces of the hubs, and between the radial projections N on the hubs, to which the arms are bolted, or otherwise securely attached. $r$ is a sliding rod situated in the hollow shaft G, having, near its outer end, a pin, $p$, passing through it, and through spirally-arranged slots $s\ s$, arranged on the outer surface of the hollow shaft G and opposite each other. The outer ends of the pin $p$, after passing through the slots, are attached to an inner rim of the movable hub L, against which the projections N N abut. To the inner end of the sliding rod $r$ are attached the cords $r^2\ r^3$, the latter passing over the pulleys $u$ and $t$, and having the weight $w$ attached to its lower end. The cord $r^2$ passes over a pulley, $u$, and thence vertically downward parallel with the cord $r^3$.

It will be seen by this construction that the weight acts to draw the rod inwardly, carrying with it the movable hub L and its arms L′, and causing, by means of the pin $p$ and spiral slots $s\ s$, a partial rotation of the rod $r$ and movable hub L on the hollow shaft G, and moving the arms L′ K′ from the position they occupy when the hubs L and K are farthest removed, and in a plane passing radially through the axis of the shaft G, to a position in a plane perpendicular thereto, in which the wind will bear with its full force upon the sails. As the pressure of the wind increases upon the sails in this latter position it will overcome the force of the weight, and the movable hub will be forced out and partially rotated, and when the hub is moved out to its full extent the wind will cease to operate the mill. A force applied to the cord $r^2$ will move the rod $r$ and the hub L outward, and thus decrease the pressure of the wind upon the sails. I is an eccentric, to which the pitman $p'$ of a pump, if it is designed to apply the power to pumping water, may be attached. C is a turn-table, to which the frame E E is attached, its outer end, preferably, being provided with friction-rollers D D, bearing against a ring attached to the upper ends of the uprights A A. The lower end of the frame E E is journaled in the cross-piece B, an opening, F, being left for the passage of the pitman $p'$ and the cords $r^2\ r^3$.

It will be observed from this construction that, should the parts become disarranged and it is desired to stop the machine, by pulling the cord $r^2$ the rod $r$ and the movable hub will be thrown outward, and no pressure will be exerted on the sails to turn them.

The flexible sails M M are made of cloth, canvas, or other similar flexible material.

Having thus described our invention, what we claim as new, and desire to secure by Letters Patent, is—

1. A hollow shaft provided with a fixed hub, to which is attached a set of arms, to which the inner ends of the flexible sails are fastened, in combination with a rod sliding and partially rotating in the hollow shaft, the rod being attached to a hub carrying a set of arms, to which the outer ends of the flexible sails are attached, substantially as described, and for the purposes set forth.

2. The hollow shaft G, provided with spiral slots $s\ s$, in combination with the fixed and movable hubs L K, having the arms L′ K′, to which flexible sails are attached, sliding and partially rotating rod $r$, weight $w$, and cord $r^3$, substantially as described, and for the purposes set forth.

SCHUYLER RUE, Jr.
WILLIAM R. MANN.

Witnesses:
HENRY B. WILLIS,
MELVILLE CHURCH.